US010724498B2

(12) United States Patent
Huang (10) Patent No.: US 10,724,498 B2
(45) Date of Patent: Jul. 28, 2020

(54) VANE DEVICE FOR A WIND TURBINE APPARATUS (71) Applicant: Kuo-Chang Huang, Tainan (TW)

(72) Inventor: Kuo-Chang Huang, Tainan (TW)

(*) Notice: Subject to any disclaimer, the term of this patent is extended or adjusted under 35 U.S.C. 154(b) by 133 days.

(21) Appl. No.: 15/796,011

(22) Filed: Oct. 27, 2017

(65) Prior Publication Data
US 2018/0051673 A1    Feb. 22, 2018

Related U.S. Application Data (63) Continuation-in-part of application No. 14/707,558, filed on May 8, 2015, now abandoned.

(30) Foreign Application Priority Data

May 20, 2014  (TW) .............................. 103117664 A (51) Int. Cl.
F03D 3/06    (2006.01)
F03D 3/00    (2006.01)
F03D 7/06    (2006.01)

(52) U.S. Cl.
CPC ............. *F03D 3/067* (2013.01); *F03D 3/002* (2013.01); *F03D 3/005* (2013.01); *F03D 3/061* (2013.01); *F03D 3/062* (2013.01); *F03D 7/06* (2013.01); *F05B 2240/218* (2013.01); *F05B 2240/313* (2013.01); *Y02E 10/74* (2013.01)

(58) Field of Classification Search
CPC .......... F03D 3/002; F03D 3/005; F03D 3/061; F03D 3/062; F03D 3/067; F03D 3/068; F05B 2240/211; F05B 2240/214; F05B 2240/216; F05B 2240/218; F05B 2240/2212; Y02E 10/74
See application file for complete search history.

(56) References Cited

U.S. PATENT DOCUMENTS

| 2,094,603 | A | * | 10/1937 | Keene | ..................... | F03D 3/068 |
| | | | | | | 416/118 |
| 3,973,864 | A | | 8/1976 | Atherton | | |
| 5,266,006 | A | * | 11/1993 | Tsui | ........................ | F03D 3/067 |
| | | | | | | 416/119 |
| 7,077,628 | B1 | | 7/2006 | Acord | | |
| 7,798,766 | B2 | | 9/2010 | Sauer | | |
| 7,918,648 | B1 | | 4/2011 | Simnacher | | |
| 8,177,481 | B2 | | 5/2012 | Liang | | |
| 9,011,096 | B2 | | 4/2015 | Su | | |
| 10,030,629 | B2 | * | 7/2018 | Huang | ..................... | F03D 3/067 |
| 2010/0233919 | A1 | | 9/2010 | Ersoy | | |

(Continued)

FOREIGN PATENT DOCUMENTS

WO    WO-2015102010 A1 *  7/2015  ............. F03D 13/20

*Primary Examiner* — Justin D Seabe
*Assistant Examiner* — Christopher R Legendre
(74) *Attorney, Agent, or Firm* — Muncy, Geissler, Olds & Lowe, P.C.

(57) ABSTRACT

A vane device includes a rotary shaft and a plurality of vane units angularly spaced apart from each other relative to the rotary shaft. Each of the vane units includes a grid frame that has grid spaces, and a plurality of vanes respectively disposed adjacent to the grid spaces. Each vane is swingable between a cover position and an open position. The size of the vanes decreases along a radial direction from a vicinity of the rotary shaft to a distance away from the rotary shaft.

16 Claims, 13 Drawing Sheets (56) References Cited

U.S. PATENT DOCUMENTS

| | | | |
|---|---|---|---|
| 2012/0195759 A1* | 8/2012 | Feldhaus | F03D 3/067 416/117 |
| 2015/0337801 A1 | 11/2015 | Huang | |
| 2017/0260964 A1* | 9/2017 | Huang | F03D 3/067 |
| 2018/0051673 A1* | 2/2018 | Huang | F03D 3/061 |

* cited by examiner

VANE DEVICE FOR A WIND TURBINE APPARATUS

CROSS-REFERENCE TO RELATED APPLICATION

This application is a continuation-in-part (CIP) of co-pending U.S. patent application Ser. No. 14/707,558 (hereinafter referred to as the '558 application). The '558 application, entitled "Vane device for a wind turbine apparatus" and filed on May 8, 2015, claims priority of Taiwanese Application No. 103117664, filed on May 20, 2014.

FIELD

The disclosure relates to a vane device, and more particularly to a vane device for a wind turbine apparatus.

BACKGROUND

Wind energy is one of the available forms of natural energy to be converted into electrical energy, and is more environmentally friendly compared with electrical energy coming from burning of fossil-fuel, such as petroleum or coal. The shape, outline and number of vanes of a wind turbine machine may affect the effectiveness of conversion from wind energy into electrical energy. A conventional vertical-axis wind turbine apparatus generally has elongated plate-like and nonperforated vanes. For vanes that can be propelled by wind blowing in a specific wind direction, a reverse wind flow may cause air resistance to hamper the movement of the vanes.

Figure 1:
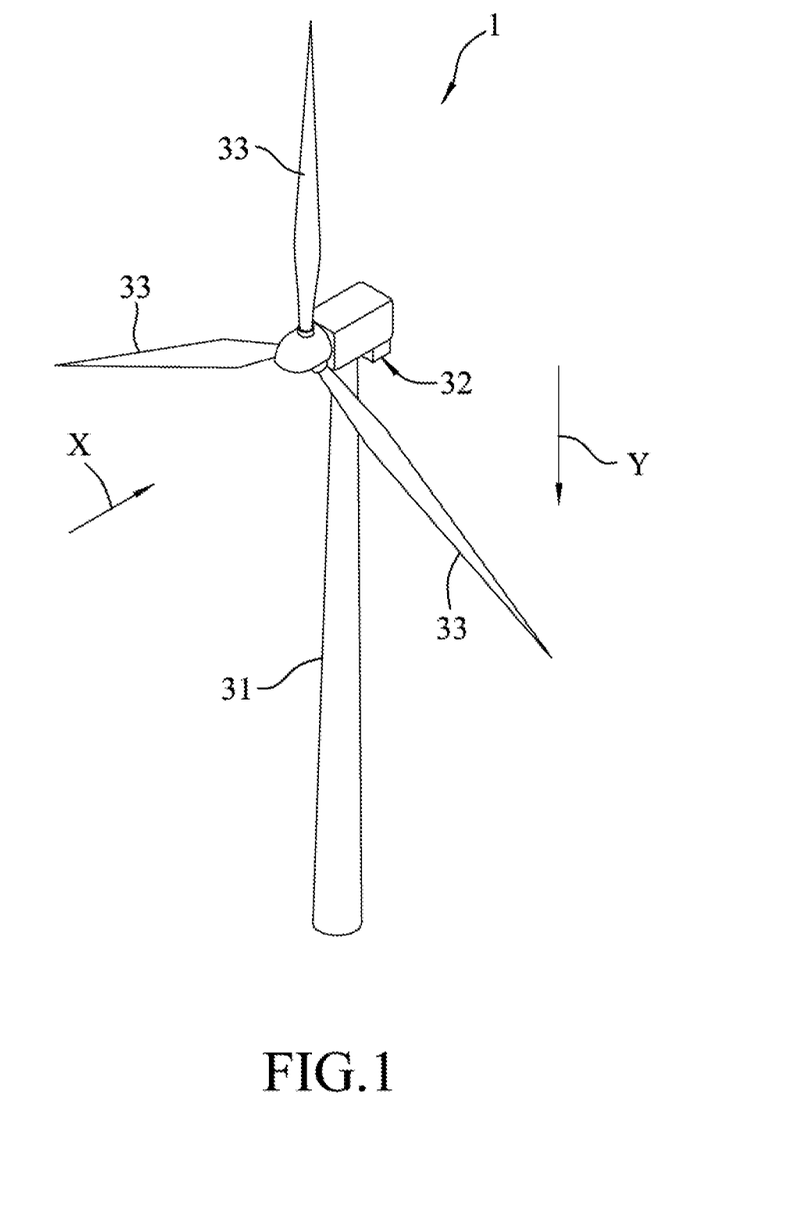
FIG. 1 is a perspective view illustrating a conventional horizontal-axis turbine apparatus.

Referring to FIG. 1, a conventional horizontal-axis wind turbine apparatus is shown and includes an upright prop 31, an electrical generator 32 mounted on a top of the upright prop 31, and three vanes 33 coupled to the electrical generator 32. The vanes 33 are equiangularly spaced apart from one another about a horizontal axis (not shown). To enhance conversion efficiency, the vanes 33 are gerally made elongate. When wind in a direction (X) propels rotation of the vanes 33, a wind shear effect in a direction (Y) may be generated to cause noise. In order to reduce the wind shear effect and the noise, the vanes 33 are designed to have converged ends distal from the electrical generator 32 at the cost of reduced overall operation efficiency.

SUMMARY

Therefore, an object of the disclosure is to provide a vane device for a wind turbine apparatus that can alleviate at least one of the drawbacks of the prior arts.

According to one aspect of the disclosure, the vane device is adapted for use in a wind turbine apparatus and includes a rotary shaft that is rotatable in a rotational direction, and a plurality of vane units that are angularly spaced apart from each other relative to the rotary shaft.

Each of the vane units includes a grid frame and a plurality of vanes.

Each of the vanes is disposed adjacent to a respective one of the grid spaces, and has a connecting end that is pivotally connected to the grid frame, and a swing end that is opposite to the connecting end. Each of the vanes is swingable between a cover position, where the swing end is adjacent to the grid frame to cover the respective one of the grid spaces, and an open position, where the swing end is away from the grid frame to uncover the respective one of the grid spaces.

The size of the vanes decreases along a radial direction from a vicinity of the rotary shaft to a distance away from the rotary shaft.

According to another aspect of the disclosure, a vane device adapted for use in a wind turbine apparatus includes a rotary shaft and a plurality of vane units.

The rotary shaft is rotatable in a rotational direction.

The vane units are angularly spaced apart from each other relative to the rotary shaft. Each vane unit includes a grid frame and a plurality of vanes. The grid frame is connected to the rotary shaft and has a plurality of grid spaces. Each of the vanes are disposed adjacent to a respective one of the grid spaces, and has a connecting end that is pivotally connected to the grid frame, and a swing end that is opposite to the connecting end. Each of the vanes is swingable between a cover position, where the swing end is adjacent to the grid frame to cover the respective one of the grid spaces, and an open position, where the swing end is away from the grid frame to uncover the respective one of the grid spaces. At least one of the vanes further has at least one opening, and at least one auxiliary flap that is disposed over the at least one opening and that is swingable relative to the at least one of the vanes to close or open the at least one opening.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that like elements are denoted by the same reference numerals throughout the disclosure.

Figure 2:
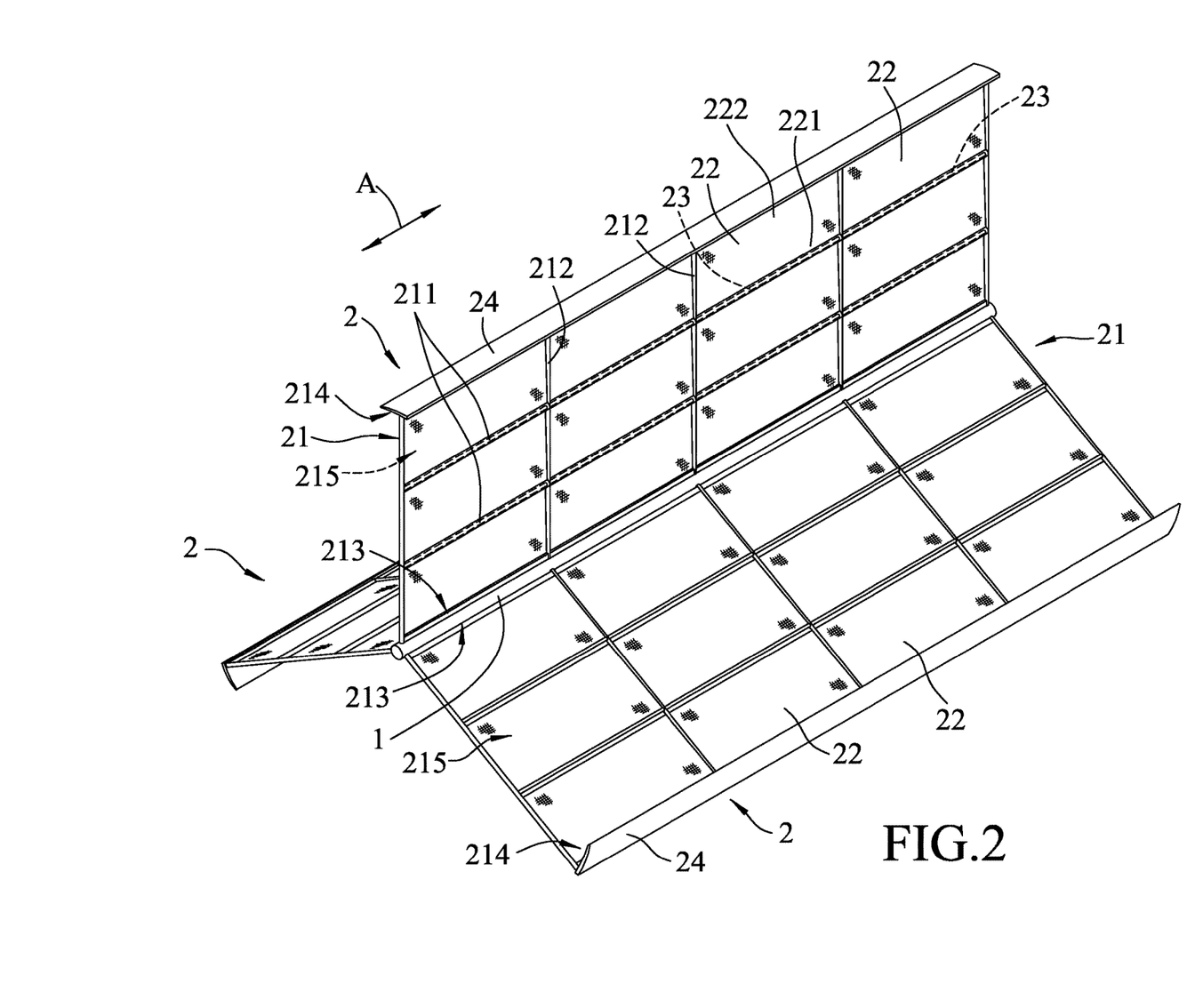
FIG. 2 is a perspective view of a first embodiment of a vane device according to the present disclosure.
Figure 3:
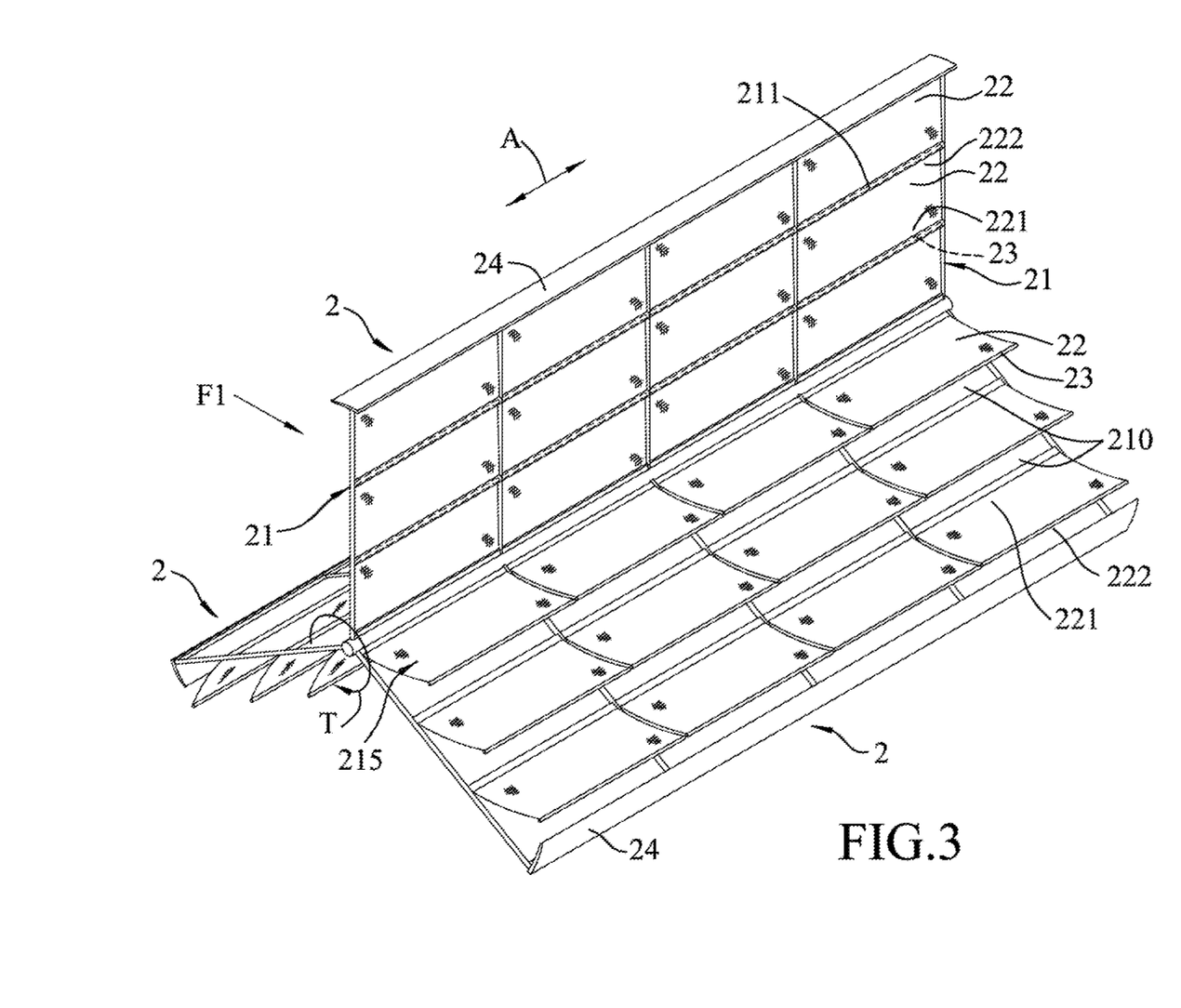
FIG. 3 is a perspective view illustrating operation of the first embodiment.
Figure 4:
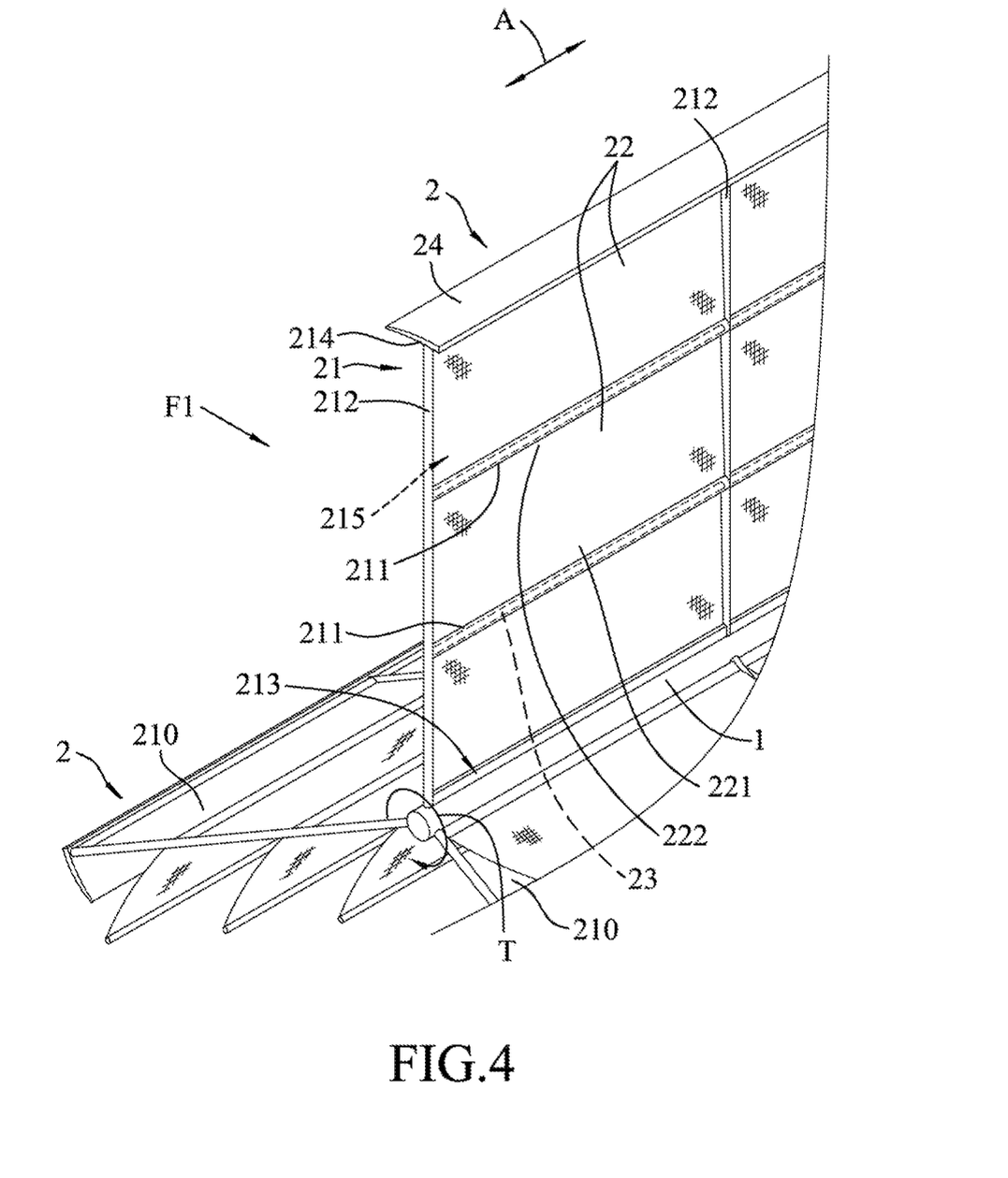
FIG. 4 is an enlarged fragmentary perspective view of FIG. 3.

Referring to FIGS. 2 to 4, the first embodiment of a vane device according to the disclosure is adapted for use in a wind turbine apparatus. The vane device includes a rotary shaft 1 and three vane units 2.

The rotary shaft 1 extends horizontally and is rotatable in a rotational direction (T).

The vane units 2 are equiangularly spaced apart from one another relative to the rotary shaft 1. Each of the vane units 2 includes a grid frame 21, a plurality of vanes 22, a plurality of counterweight members 23 and a block member 24.

The grid frames 21 of the vane units 2 are spaced 120 degrees apart from each other. For each of the vane units 2, the grid frame 21 is connected to the rotary shaft 1 and has a plurality of grid spaces 210. In this embodiment, the grid frame 21 of each of the vane units 2 has a plurality of first grid rods 211 that extend in an axial direction (A) parallel to the rotary shaft 1 and that are mutually spaced apart in a radial direction with respect to the rotary shaft 1, and a plurality of second grid rods 212 that extend in the radial direction and that are mutually spaced apart in the axial direction (A). The first grid rods 211 and the second grid rods 212 cooperatively define the grid spaces 210. As shown in FIGS. 2 and 4, the grid frame 21 of each of the vane units 2 has an inner end portion 213 that is connected to the rotary shaft 1 and that extends in the axial direction (A), and an outer end portion 214 that is distal from the rotary shaft 1 and that is opposite to the inner end portion 213.

For each of the vane units 2, each of the vanes 22 is disposed adjacent to a respective one of the grid spaces 210, and has a connecting end 221 that is pivotally connected to the grid frame 21, and a swing end 222 that is opposite to the connecting end 221. Specifically, for each of the vanes 22, the connecting end 221 is pivotally connected to one of the first grid rods 211, and the swing end 222 is capable of abutting against an upwind side (i.e., a side to face toward a wind force (F1)) of another one of the first grid rods 211 which is farther from the rotary shaft 1, and which is adjacent to the one of the first grid rods 211. The connecting end 221 of each of the vanes 22 may be pivotally connected to a pivot rod (not shown) that is connected between two lugs (not shown) mounted on the one of the first grid rods 211. However, the connection between each of the vanes 22 and the one of the first grid rods 211 may vary in other embodiments of the disclosure.

In this embodiment, each of the vanes 22 may be a hard sheet which is made from one of metal, fiberglass, hard plastic or hard polymer material, or may alternatively be a soft sheet which is made from one of a cloth, rubber, soft plastic or soft polymer material.

For each of the vane units 2, the counterweight members 23 are respectively coupled to the swing ends 222 of the vanes 22 so as to facilitate pivot movement of the vanes 22.

For each of the vane units 2, the block member 24 is an elongate plate that has a curved cross-section, that is coupled to the outer end portion 214 of the grid frame 21 and that extends from the outer end portion 214 in a direction opposite to the rotational direction (T).

In actual use, each of the vanes 22 is swingable between a cover position (see FIG. 2), where the swing end 222 is adjacent to the grid frame 21 to cover the respective one of the grid spaces 210, and an open position (see the lower two of the vane units 2 shown in FIGS. 3 and 4), where the swing end 222 is away from the grid frame 21 to uncover the respective one of the grid spaces 210 for allowing air flow to pass through the respective one of the grid spaces 210.

Specifically, the rotary shaft 1 can be disposed only a few meters above the ground while the wind turbine apparatus properly operates by difference of wind pressures on the vanes 22 at different heights. When an upwind region 215 of the grid frame 21 of one of the vane units 2 (i.e., the upper one of the vane units 2 shown in FIGS. 2 to 4 and 7) is brought to face the wind, the vanes 22 of the one of the vane units 2 are driven by the wind force (F1) to the cover position to cover the grid spaces 210 of the grid frame 21 with the swing ends 222 thereof abutting against the corresponding upwind sides of the first grid rods 211. As such, with the vanes 22 of the one of the vane units 2 being held at the cover position, the vanes 22 of the one of the vane units 2 cooperatively form an integral upwind surface for the wind force (F1) to act on to have torque on the rotary shaft 1 for rotating the rotary shaft 1 in the rotational direction (T). The counterweight members 23 of the one of the vane units 2 facilitate abutment of the swing ends 222 of the corresponding vanes 22 against the corresponding upwind sides of the first grid rods 211.

Meanwhile, the upwind regions 215 of the grid frame 21 of the other two of the vane units 2 (i.e., the lower two of the vane units 2 shown in FIGS. 2 to 4) face away from the wind force (F1), so that the vanes 22 of the other two of the vane units 2 swing to the open positions. Accordingly, reverse torque and wind drag caused by the wind force (F1) on the other two of the vane units 2 are reduced. That is to say, the abovementioned force difference propels the three vane units 2 to rotate in the rotational direction (T), thereby increasing efficiency to utilize the wind power.

Further, the block member 24 of each of the vane units 2 can limit the wind flow. When the upwind region 215 of the grid frame 21 of the one of the vane units 2 faces the wind, since each of the vanes 22 are in the cover position, the block member 24 of the one of the vane units 2 would guide the wind flow toward the integral upwind surface formed by the vanes 22 for propelling the one of the vane units 2 and enhancing the torque.

In addition, since a torque acted on a spot of the one of the vane units 2 is smaller than that acted on a farther spot of the one of the vane units 2 with respect to the rotary shaft 1, the vanes 22 radially farther from the rotary shaft 1 can be designed smaller, and the vanes 22 at a vicinity of the rotary shaft 1 can be designed larger. In some embodiments, guiding plates (not shown) may be included to assist with collection and guidance of the air flow of the wind toward the integral upwind surface.

To sum up, for each of the vane units 2, since each of the vanes 22 is configured to be swingable between the cover and open positions, the wind force difference can act on the vane units 2 to operate the vane device of this disclosure with less reverse torque and wind drag. In addition, compared with the vanes of the conventional wind turbine apparatus which has to be disposed greater than ten meters from the ground, the vane device of this disclosure can be settled only a few meters from the ground, thereby reducing fabrication and material cost. Further, by virtue of the structural configuration of the vane units 2, the vane device of this disclosure can be operated with less noise.

Figure 5:
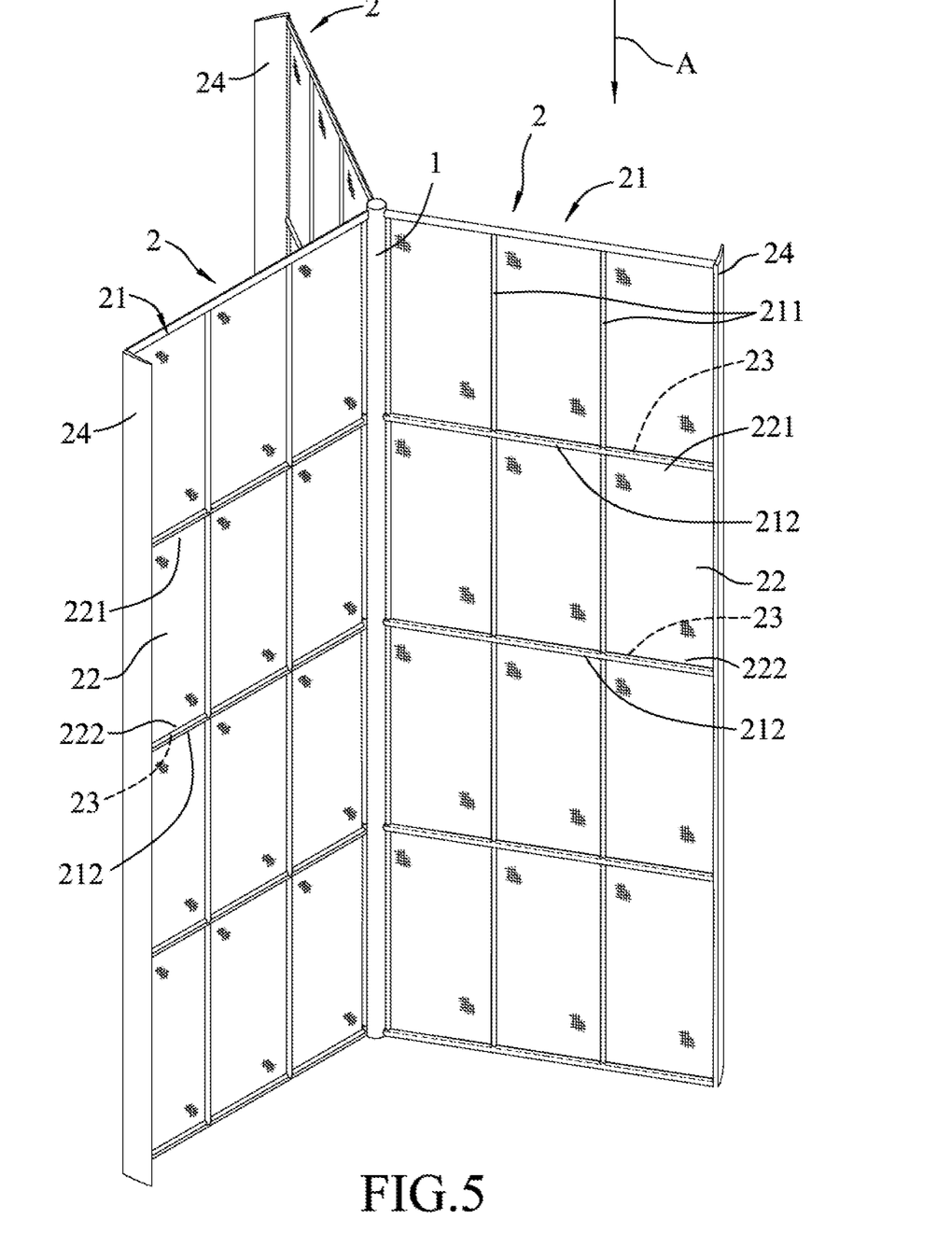
FIG. 5 is a perspective view of a second embodiment of a vane device according to the present disclosure.
Figure 6:
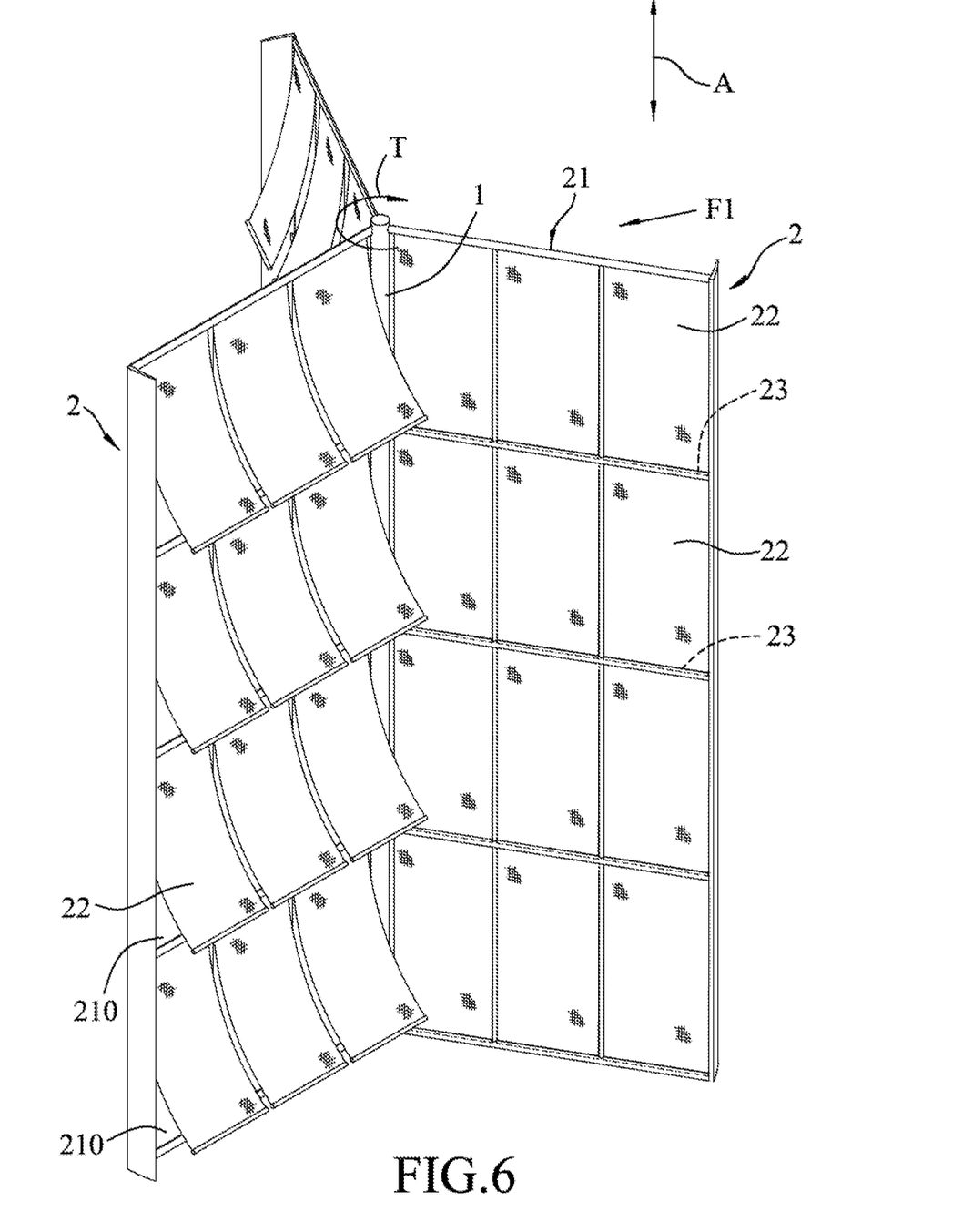
FIG. 6 is a perspective view illustrating operation of the second embodiment.
Figure 7:
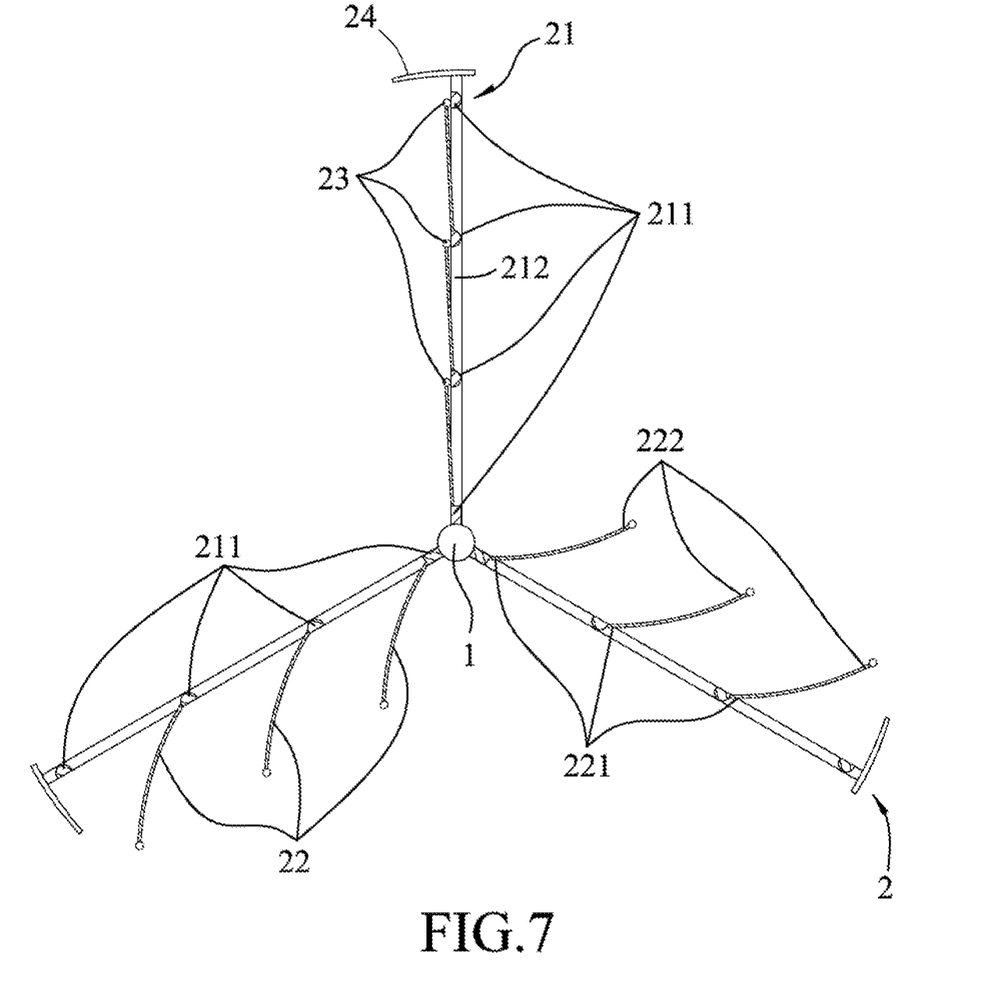
FIG. 7 is a side sectional view of a vane unit of the first embodiment.
Figure 8:
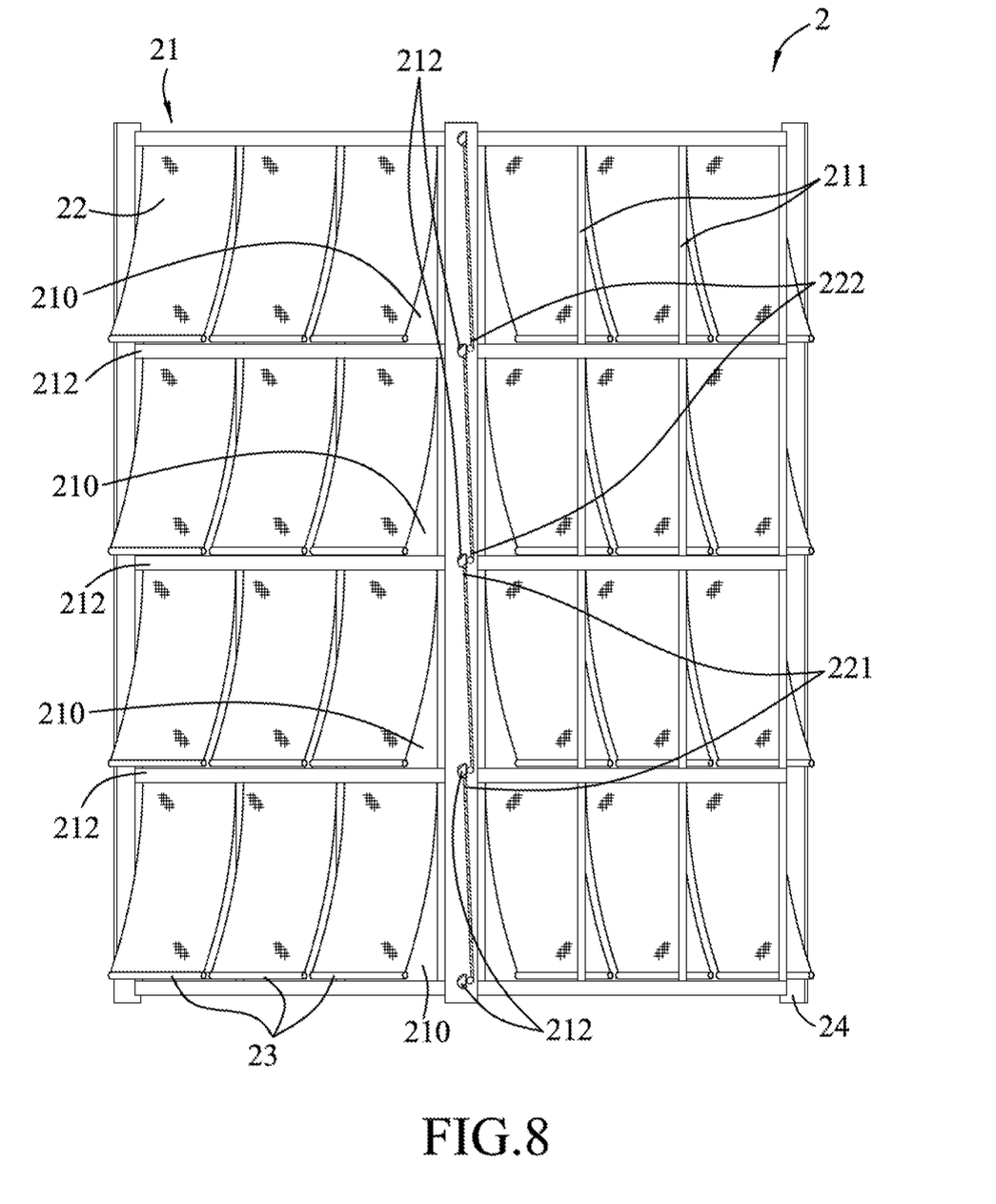
FIG. 8 is a side sectional view of a vane unit of the second embodiment.

FIGS. 5, 6 and 8 illustrate the second embodiment of a vane device according to the present disclosure, which has a configuration similar to that of the first embodiment. Some differences between the first and second embodiments are depicted hereinafter. In the second embodiment, the rotary shaft 1 extends vertically. For each of the vanes 22, the connecting end 221 is connected pivotally to one of the second grid rods 212, and the swing end 222 is capable of abutting against an upwind side of another one of the second grid rods 212 which is adjacent to and vertically under the one of the second grid rods 212. The counterweight members 23 of the one of the vane units 2 facilitate abutment of the swing ends 222 of the corresponding vanes 22 against the corresponding upwind sides of the second grid rods 212.

In actual use, the second embodiment has the same advantages as those of the first embodiment.

Figure 9:
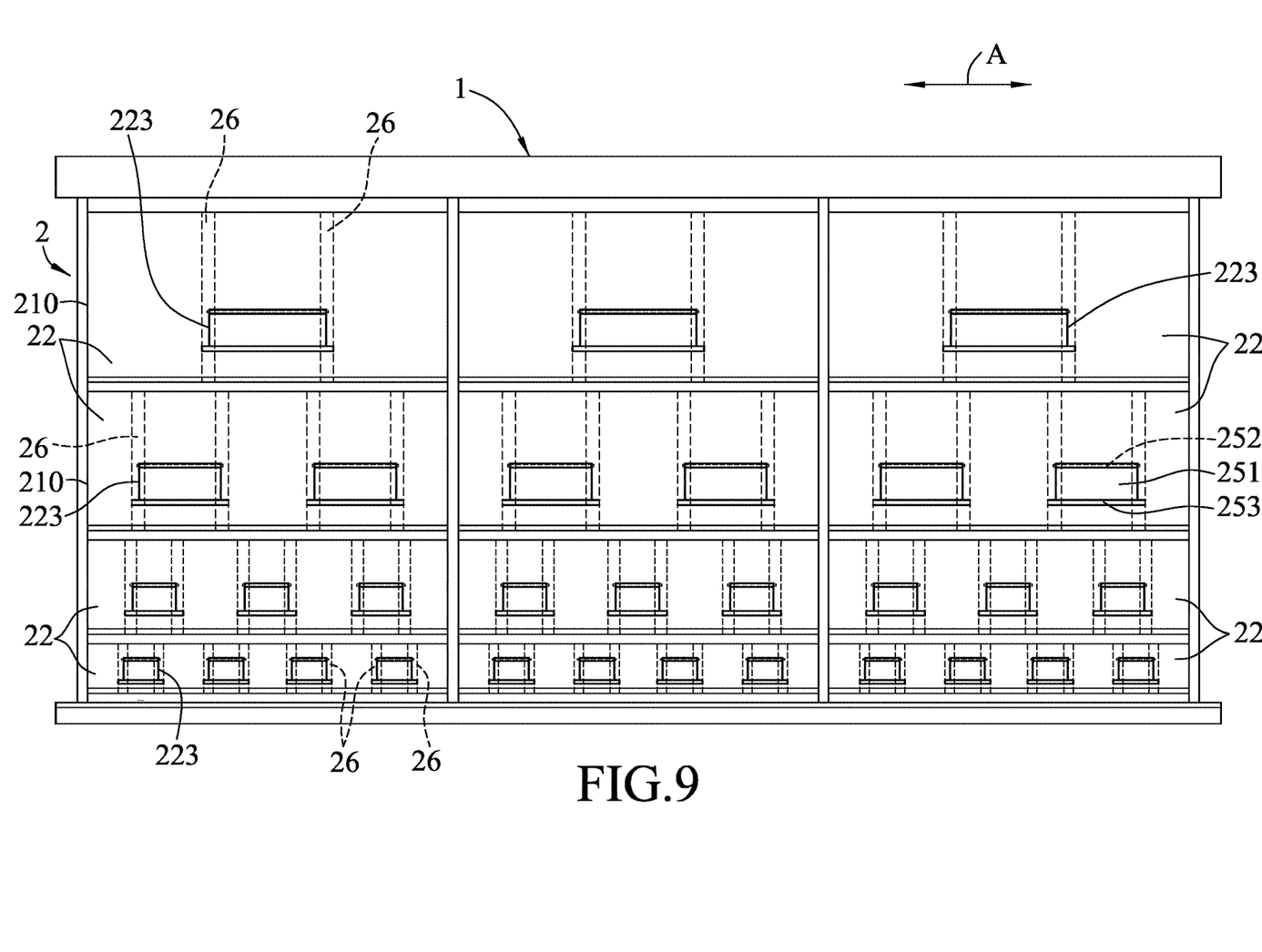
FIG. 9 is a plan view illustrating a vane unit of a vane device according to a third embodiment of the present disclosure.
Figure 10:
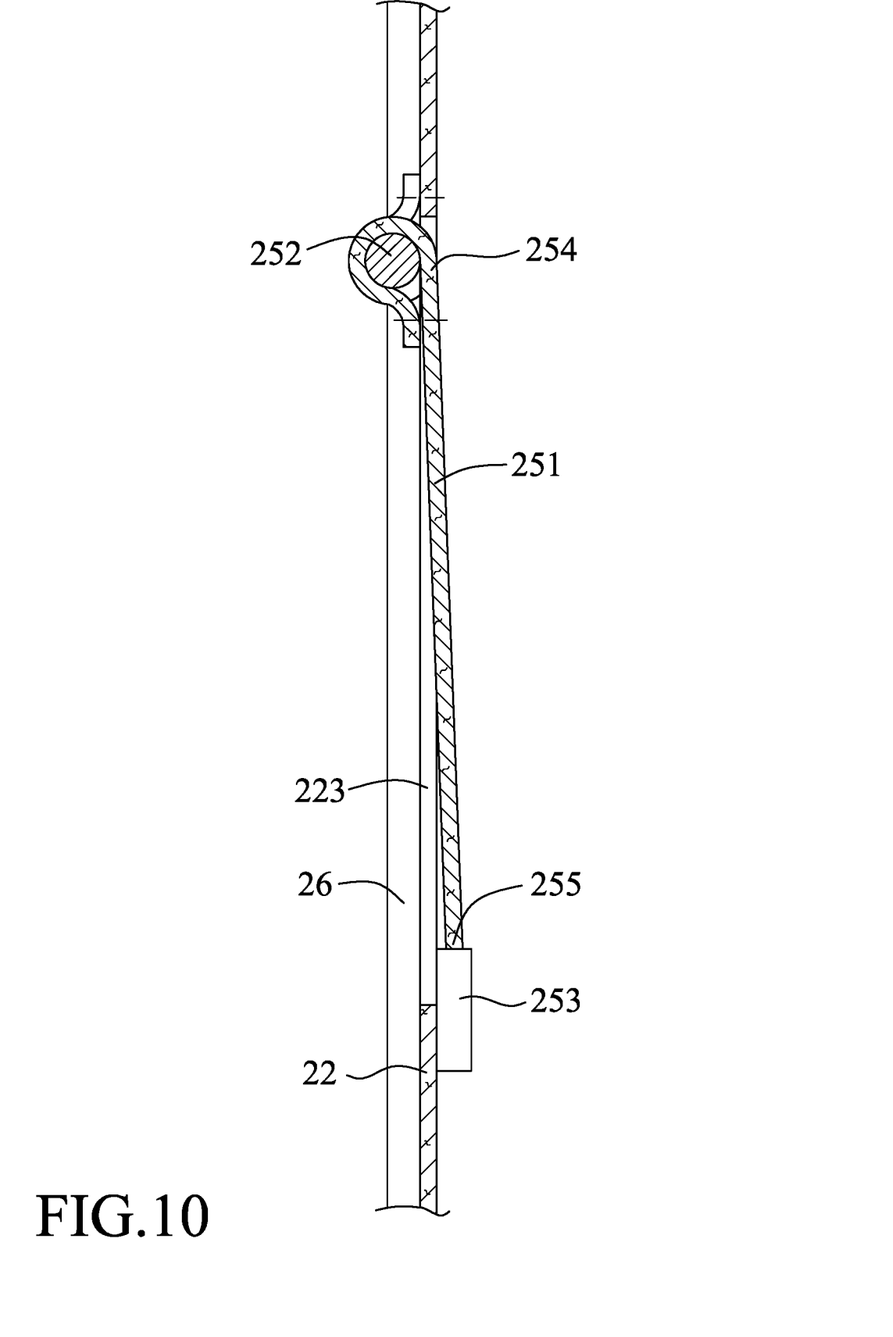
FIG. 10 is a fragmentary sectional view illustrating a vane and an auxiliary flap of the vane unit in the third embodiment.
Figure 11:
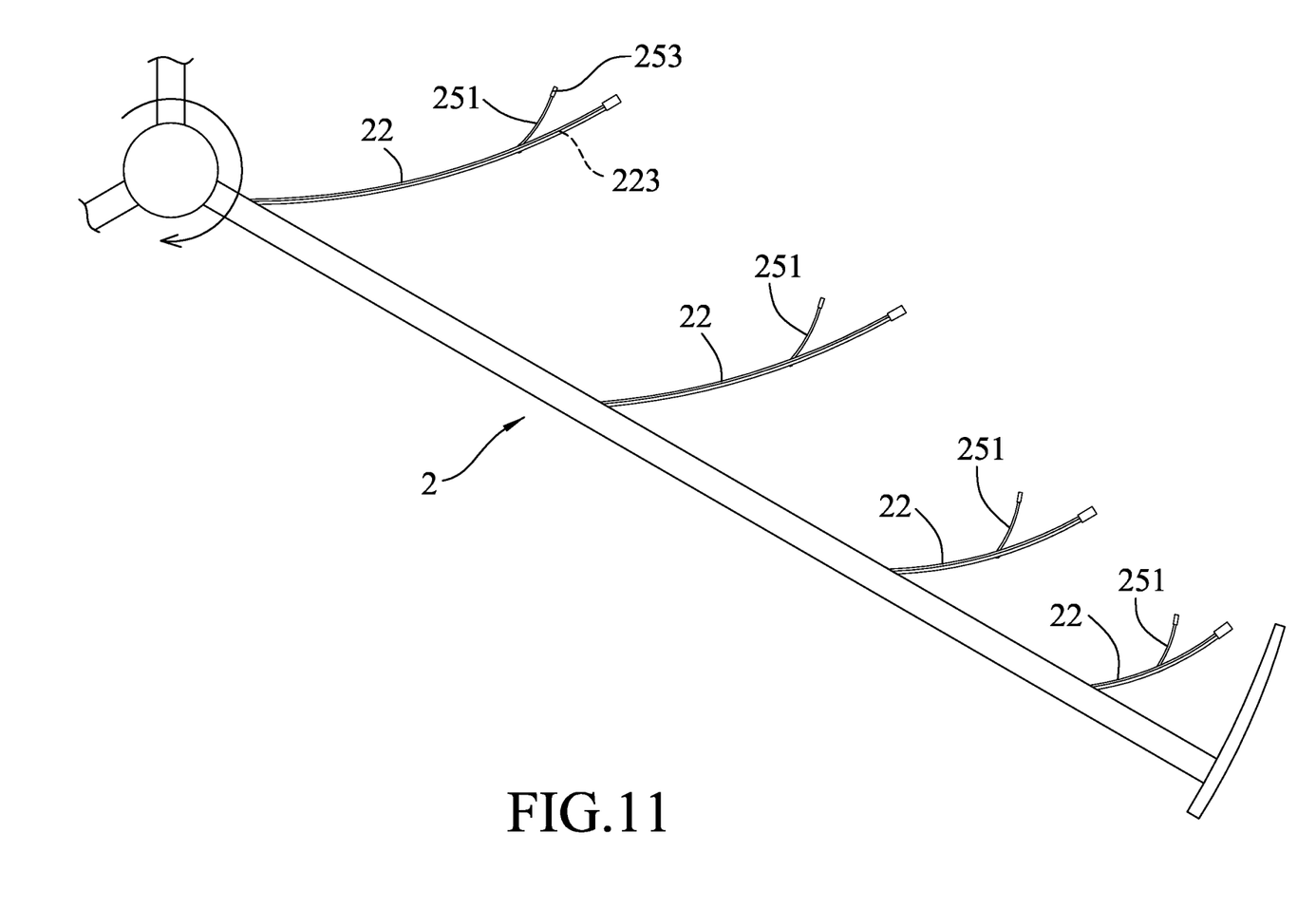
FIG. 11 is a side view showing the vane and the auxiliary flap of FIG. 10.

Referring to FIGS. 9 to 11, a vane device according to a third embodiment of the present disclosure is shown and has a configuration generally similar to that of the first embodiment. However, in the third embodiment, the size of the vanes 22 decreases along a radial direction from a vicinity of the rotary shaft 1 to a distance away from the rotary shaft 1. The longer the radial distance from the rotary shaft 1, the smaller the size of the vanes 22. Specifically, the vanes 22 include four differently sized vanes, the radial lengths of which are in the ratio of 1:3/4:1/2:1/4. During operation, the speed of the vanes 22 radially farther from the rotary shaft 1 is faster than that of the vanes 22 near the rotary shaft 1. Because centrifugal forces of the vanes 22 distal from the rotary shaft 1 are large in addition to their fast speeds, the distal vanes 22 may encounter the problem, in which the vanes 22 cannot be closed easily subsequent to their opening actions, the speed of the closing action is low, the closing period is long, or the closing action is inefficient. In particular, since the rotary shaft 1 is horizontal, when each vane unit 2 rotates upward to an upper level from a lower level, the vanes 22 are open at the lower level. When the vanes 22 rotates upward to the upper level, there may be a problem in that the vanes 22 distal from the rotary shaft 1 cannot easily move to their closed positions, thereby resulting in wind leakage. To avoid the problem, the vanes 22 radially distal from the rotary shaft 1 are arranged to be small in the third embodiment so that they can be easily blown by upwind to properly and timely move to the cover position.

Each vane 22 further has an opening 223, an auxiliary flap 251 that is disposed over the opening 223 and that is swingable relative to the respective vane 22, and at least one radially extending first reinforcement rib 26.

The auxiliary flap 251 has a flap connection end 254, a flap free end 255, a flap connection shaft 252 and a flap counterweight member 253. The flap free end 255 is opposite to the flap connection end 254. The flap connection end 254 is disposed between the rotary shaft 1 and the flap free end 255. In this embodiment, the auxiliary flap 251 is a hard sheet and is made from, but not limited to, a metal material, a fiber glass material, or a hard plastic material. The flap connection shaft 252 extends in the axial direction (A) and connects the flap connection end 254 to the respective vane 22. The flap counterweight member 253 is disposed on the flap free end 255 to increase the weight thereof, such that the auxiliary flap 251 can hang down and is sufficiently weighted to swing.

During operation, when the vanes 22 are blown and opened by the wind, the auxiliary flaps 251 thereof are also blown by the wind to uncover the openings 223. As the wind passes through the openings 223, the opening angles of the vanes 22 are reduced. Therefore, when each vane unit 2 rotates from the lower level to the upper level, the vanes 22 can easily and rapidly move to the cover positions to cover the grid spaces 210.

The openings 223 and the auxiliary flaps 251 are arranged to decrease in size along the radial direction from the vicinity of the rotary shaft 1 to the distance away from the rotary shaft 1. That is to say, the larger the radial distance from the rotary shaft 1, the smaller the size of the openings 223 and the auxiliary flaps 251. As such, the auxiliary flaps 251 can rapidly cover the openings 223 after uncovering the opening 223. In addition, the number of the auxiliary flaps 251 and the openings 223 of the vanes 22 may be designed to increase along the radial direction from the vicinity of the rotary shaft 1 to the distance away from the rotary shaft 1 such that the larger the distance from the rotary shaft 1, the greater the number of the auxiliary flaps 251 and the openings 223. Therefore, the vanes 22 radially away from the rotary shaft 1 can rapidly swing to the cover positions to avoid wind leakage.

In this embodiment, each vane 22 has a plurality of radially extending first reinforcement ribs 26. Each radially extending first reinforcement rib 26 extends in a direction perpendicular to the axial direction (A). Each first reinforcement rib 26 is made from metal or plastic materials, and is fixed to a surface of the respective vane 22 by a welding process, or other suitable fixing methods. Alternatively, the vanes 22 and the first reinforcement ribs 26 may be made from the same material and may be integrally formed as a single piece structure. As such, each vane 22 is partially thickened and structurally reinforced.

The first reinforcement ribs 26 are arranged in pairs in this embodiment. Each pair of the first reinforcement ribs 26 are disposed on two opposite sides of one of the openings 223. In other embodiments, the first reinforcement ribs 26 are disposed in some of the vanes 22, rather than being disposed in each of the vanes 22. It should be noted that the first reinforcement ribs 26 may be omitted if the vanes 22 are hard sheets.

Figure 12:
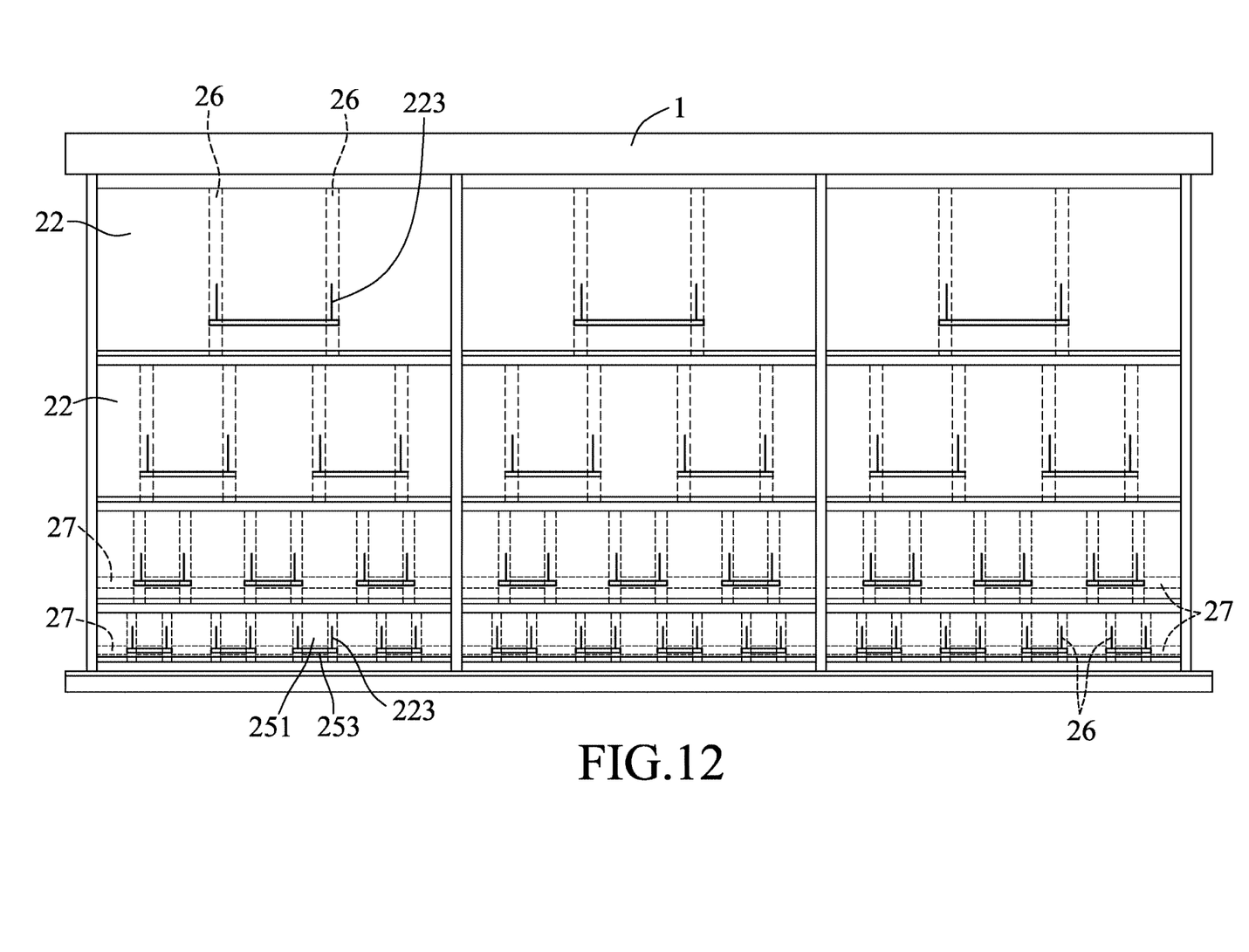
FIG. 12 illustrates a vane unit a vane device according to a fourth embodiment of the present disclosure.
Figure 13:
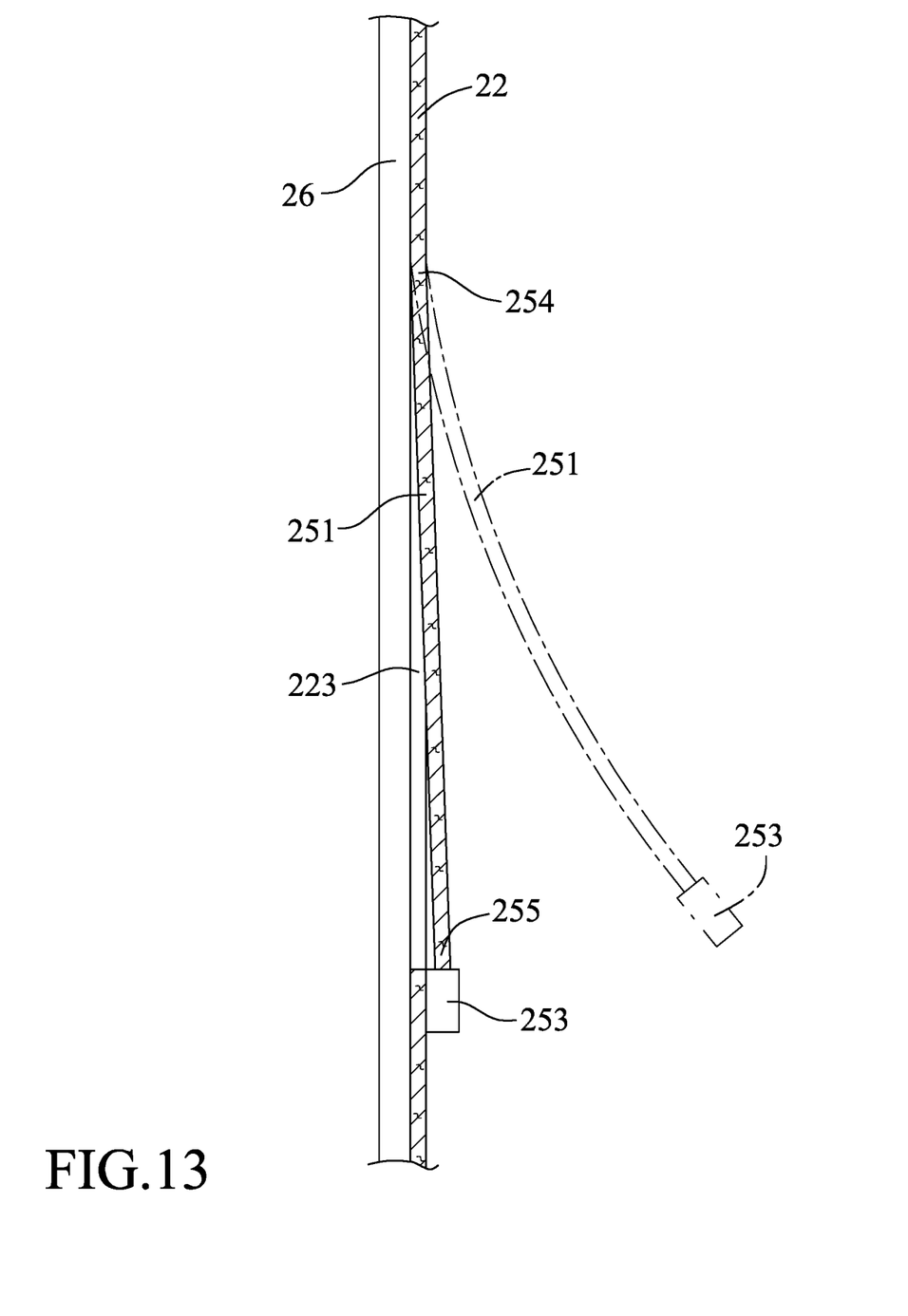
FIG. 13 is a fragmentary sectional view illustrating the vane and the auxiliary flap of the third embodiment.

Referring to FIGS. 12 and 13, a vane device according to a fourth embodiment of the present disclosure is shown, and has a configuration generally similar to that of the third embodiment. However, in the fourth embodiment, each vane 22 and the respective auxiliary flap 251 are integrally formed as a single piece structure. Therefore, the flap connection shafts 252 of the auxiliary flaps 251 are omitted. Each auxiliary flap 251 is made by forming a u-shaped cut in the respective vane 22, and is formed from a cut part surrounded by the U-shaped cut and partially separated from the respective vane 22 for swinging movements. In this embodiment, the auxiliary flaps 251 and the respective vanes 22 are made from a same soft material, such as cloth, rubber, soft plastic, or soft polymer material. In other embodiments, each first reinforcement rib 26 is made from a non-metal hard material, and is fixed to the respective vane 22 by melt bonding, or adhesive bonding, or is formed integrally with the respective vane 22 into a single piece structure. In case the vanes 22 and the auxiliary flaps 251 are made of cloth, they may be fixed together by sewing.

During operation, the auxiliary flaps 251 radially farthest away from the rotary shaft 1 can swing rapidly to cover or uncover the openings 223. The rapid closing action subsequent to the opening action of the auxiliary flaps 251 can induce impact forces and hence can damage the vanes 22, which is made from the soft material. In order to address this problem, two rows of the vanes 22, i.e., the farthest row of the vanes 22 and the row next to the farthest row (see FIG. 12), are respectively provided with second reinforcement ribs 27 that extend parallel with the rotary shaft 1 and are transverse to the openings 223 of the vanes 22 in the two rows. The second reinforcement ribs 27 are disposed near the flap free ends 255 of the auxiliary flaps 251 and allow the flap free ends 255 to abut thereagainst when the flap free ends 255 swing to their closing position. Since the vanes 22 are partially thickened by the second reinforcement ribs 27 near the flap free ends 255, they are structurally reinforced to resist impact forces induced by the closing action of the auxiliary flaps 251.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A vane device adapted for use in a wind turbine apparatus, said vane device comprising:
    a rotary shaft that is rotatable in a rotational direction about a rotational axis extending in an axial direction of the vane device; and
    a plurality of vane units that are angularly spaced apart from each other relative to said rotary shaft, each of said vane units including:
        a grid frame that is connected to said rotary shaft and that has a plurality of grid spaces arranged in rows along the axial direction and columns along a radial direction perpendicular to the axial direction, and
        a plurality of vanes, each of said vanes being disposed adjacent to a respective one of said grid spaces, and having a connecting end that is pivotally connected to said grid frame, and a swing end that is opposite to said connecting end, each of said vanes being swingable between a cover position, where said swing end is adjacent to said grid frame to cover the respective one of said grid spaces, and an open position, where said swing end is away from said grid frame to uncover the respective one of said grid spaces;
    wherein each vane of the plurality of vanes has an area defined by a dimension in the axial direction and a dimension in the radial direction; wherein, along the radial direction extending outwardly from the rotational axis, the areas of the vanes decrease across the columns.

2. The vane device as claimed in claim 1, wherein each of said vane units further includes a plurality of counterweight members that are respectively coupled to said swing ends of said vanes.

3. The vane device as claimed in claim 1, wherein said grid frame of each of said vane units has an inner end portion that is connected to said rotary shaft, and an outer end portion that is distal from said rotary shaft and that is opposite to said inner end portion, each of said vane units further having a block member that is coupled to said outer end portion of said grid frame and that extends in a direction opposite to the rotational direction.

4. The vane device as claimed in claim 1, wherein said grid frame of each of said vane units includes a plurality of first grid rods that extend in the axial direction and that are mutually spaced apart in the radial direction, and a plurality of second grid rods that extend in the radial direction and that are mutually spaced apart in the axial direction, said first grid rods and said second grid rods cooperatively defining said grid spaces.

5. The vane device as claimed in claim 4, wherein:
    said rotary shaft extends horizontally; and
    for each of said vanes, said connecting end is pivotally connected to one of said first grid rods, and said swing end is capable of abutting against an upwind side of another one of said first grid rods which is farther from said rotary shaft, and which is adjacent to said one of said first grid rods.

6. The vane device as claimed in claim 4, wherein:
    said rotary shaft extends vertically; and
    for each of said vanes, said connecting end is connected pivotally to one of said second grid rods, and said swing end is capable of abutting against an upwind side of another one of said second grid rods which is adjacent to and vertically under said one of said second grid rods.

7. The vane device as claimed in claim 1, wherein at least one of said vanes further has at least one opening, and at least one auxiliary flap that is disposed over said at least one opening and that is swingable relative to said at least one of said vanes.

8. The vane device as claimed in claim 7, wherein each of said vanes further has said at least one opening, and said at least one auxiliary flap that is swingably disposed over said at least one opening.

9. The vane device as claimed in claim 8, wherein each of said at least one auxiliary flap has an area defined by a dimension in the axial direction and a dimension in the radial direction, wherein, along the radial direction extending outwardly from the rotational axis, the areas of the at least one auxiliary flap decreases across the columns.

10. The vane device as claimed in claim 8, wherein said vanes have an increase in number of said at least one auxiliary flap and of said at least one opening along the radial direction extending outwardly from the rotational axis.

11. The vane device as claimed in claim 8, wherein said auxiliary flap of each of said vanes has a flap connection end and a flap free end, said flap connection end being connected to the respective one of said vanes, said flap free end being opposite to said flap connection end, said flap connection end being disposed between said rotary shaft and said flap free end.

12. The vane device as claimed in claim 11, wherein said at least one auxiliary flap of each of said vanes further has a flap counterweight member disposed on said flap free end.

13. The vane device as claimed in claim 11, wherein said at least one auxiliary flap of each of said vanes further has a flap connection shaft connecting said flap connection end to the respective one of said vanes.

14. The vane device as claimed in claim 11, wherein each of said vanes has said at least one auxiliary flap integrally formed therewith as a single piece structure.

15. The vane device as claimed in claim 8, wherein each of said vanes further has at least one radially extending first reinforcement rib.

16. The vane device as claimed in claim 8, wherein said vanes have varying radial distances from said rotary shaft, at least one of said vanes at the largest radial distance from said rotary shaft further has a second reinforcement rib extending parallel with said rotary shaft.

* * * * *